United States Patent
Propst et al.

(10) Patent No.: US 11,752,739 B2
(45) Date of Patent: Sep. 12, 2023

(54) PRINTABLE FILM (71) Applicant: Taghleef Industries Inc., Newark, DE (US)

(72) Inventors: Eric Propst, Terre Haute, IN (US); Christoph Michel, Terre Haute, IN (US)

(73) Assignee: Taghleef Industries Inc., Newark, DE (US)

( * ) Notice: Subject to any disclaimer, the term of this patent is extended or adjusted under 35 U.S.C. 154(b) by 0 days.

(21) Appl. No.: 17/414,769

(22) PCT Filed: Dec. 16, 2019

(86) PCT No.: PCT/US2019/066564
§ 371 (c)(1),
(2) Date: Jun. 16, 2021

(87) PCT Pub. No.: WO2020/131709
PCT Pub. Date: Jun. 25, 2020

(65) Prior Publication Data
US 2022/0063251 A1 Mar. 3, 2022

Related U.S. Application Data

(60) Provisional application No. 62/780,515, filed on Dec. 17, 2018.

(51) Int. Cl.
*B32B 27/06* (2006.01)
*B32B 5/18* (2006.01)
(Continued)

(52) U.S. Cl.
CPC .............. *B32B 27/065* (2013.01); *B32B 5/18* (2013.01); *B32B 27/16* (2013.01); *B32B 27/20* (2013.01); *B32B 27/205* (2013.01); *B32B 27/32* (2013.01); *B32B 38/0008* (2013.01); *B32B 38/0036* (2013.01); *B41M 5/502* (2013.01); *C08J 3/226* (2013.01); *C08J 5/18* (2013.01); *B29C 48/0018* (2019.02); *B29C 48/08* (2019.02); *B29C 48/21* (2019.02); *B29C 55/12* (2013.01); *B29K 2023/08* (2013.01); *B29K 2023/12* (2013.01); *B29K 2023/14* (2013.01); *B29K 2105/0085* (2013.01); *B29K 2995/0053* (2013.01); *B32B 2038/0028* (2013.01); *B32B 2038/0048* (2013.01); *B32B 2250/02* (2013.01); *B32B 2250/246* (2013.01); *B32B 2266/025* (2013.01); *B32B 2266/0242* (2013.01); *B32B 2266/057* (2016.11); *B32B 2266/102* (2016.11); *B32B 2266/12* (2016.11); *B32B 2270/00* (2013.01); *B32B 2305/026* (2013.01); *B32B 2307/414* (2013.01); *B32B 2307/518* (2013.01);
(Continued)

(58) Field of Classification Search
CPC .... B32B 2307/4023; B32B 2307/1026; B32B 2307/414; B32B 2307/516; B32B 2307/518; B32B 2307/726; B32B 2307/75; B32B 2310/14; B32B 2323/04; B32B 2323/10; B32B 2333/08; B32B 2405/00; B32B 2519/00; B32B 27/065; B32B 27/08; B32B 27/16; B32B 27/20; B32B 27/205; B32B 27/32; B32B 27/327; B32B 5/18; B32B 7/02; B32B 7/023; B32B 7/12; B32B 2038/0028; B32B 2038/0048; B32B 2250/02; B32B 2250/03; B32B 2250/04; B32B 2250/05; B32B 2250/242; B32B 2250/246; B32B 2264/102; B32B 2266/0242; B32B 2266/025; B32B 2266/057; B32B 2266/102; B32B 2266/12; B32B 2270/00; B32B 2305/026; C08J 2323/00; C08J 2323/12; C08J 2323/14; C08J 2423/00; C08J 2423/14; C08J 2423/26; C08J 2433/08; C08J 3/226; C08J 5/18; C08K 3/36; C08L 23/02
See application file for complete search history.

(56) References Cited

U.S. PATENT DOCUMENTS

| 4,741,950 A | 5/1988 | Liu et al. |
| 6,066,691 A * | 5/2000 | Sobottka ................. C08K 3/34 502/77 |

(Continued)

FOREIGN PATENT DOCUMENTS

| CN | 1089573 A | * 7/1994 |
| EP | 1721737 A1 | 11/2006 |

(Continued)

OTHER PUBLICATIONS

Translation of CN 1089573 A, Y. Song, Jul. 1994. (Year: 1994).*

(Continued)

*Primary Examiner* — Hai Vo
(74) *Attorney, Agent, or Firm* — CAESAR RIVISE, PC (57) ABSTRACT

An extruded multilayer film includes a top layer comprising a blend of a polyolefin and adsorbent silica. The adsorbent silica is 5% or more of the blend and the polyolefin is 95% or less of the blend. The multilayer film is oriented in at least one direction to cause fracturing of the top layer to provide a microporous surface exposing the adsorbent silica gel. The fractured top layer is receptive to receiving a printing ink on an exposed surface thereof with enhanced pigment entrapment and rapid ink drying. A single layer film in the form of the top layer, and also oriented in at least one direction also constitutes a part of this invention.

17 Claims, 5 Drawing Sheets

(51) Int. Cl.
*B32B 27/16* (2006.01)
*B32B 27/20* (2006.01)
*B32B 27/32* (2006.01)
*B32B 38/00* (2006.01)
*B41M 5/50* (2006.01)
*C08J 3/22* (2006.01)
*C08J 5/18* (2006.01)
*B29C 48/08* (2019.01)
*B29C 48/21* (2019.01)
*B29C 48/00* (2019.01)
*B29C 55/12* (2006.01)
*B29K 23/00* (2006.01)
*B29K 105/00* (2006.01)
*C08K 3/36* (2006.01)

(52) U.S. Cl.
CPC ..... *B32B 2307/726* (2013.01); *B32B 2307/75* (2013.01); *B32B 2310/14* (2013.01); *B32B 2323/04* (2013.01); *B32B 2323/10* (2013.01); *B32B 2333/08* (2013.01); *B32B 2519/00* (2013.01); *C08J 2323/12* (2013.01); *C08J 2323/14* (2013.01); *C08J 2423/14* (2013.01); *C08J 2433/08* (2013.01); *C08K 3/36* (2013.01)

(56) References Cited

U.S. PATENT DOCUMENTS

2003/0207138 A1* 11/2003 Kong ............... C08L 23/12
428/500
2004/0151934 A1 8/2004 Schwark et al.

FOREIGN PATENT DOCUMENTS

| JP | H03130150 A | 6/1991 |
| JP | 2018115012 A | 7/2018 |
| WO | 03093004 A1 | 11/2003 |

OTHER PUBLICATIONS

English Abstract for JP H03130150 A (1991).
English Abstract for JP 2018115012 A (2018).
International Search Report for PCT/US2019/066564 dated Aug. 27, 2020.

* cited by examiner

PRINTABLE FILM

CROSS REFERENCE TO RELATED APPLICATIONS

This application is a U.S. national phase application of PCT/US2019/066564, filed Dec. 16, 2019, which claims the benefit under 35 U.S.C. § 119(e) of Application Ser. No. 62/780,515 filed on Dec. 17, 2018 entitled PRINTABLE FILM, LABEL MADE FROM PRINTABLE FILM AND COMPOSITION EMPLOYED FOR MAKING PRINTABLE FILM, the contents of which applications are incorporated herein by reference in their entireties for all purposes.

TECHNICAL FIELD

The present invention pertains generally to a printable film and more specifically to either a single layer film or a multilayer film usable as synthetic paper having a printable surface for receiving printed indicia from a variety of printing methods, e.g., inkjet, flexographic and gravure. The particular printing method employed does not constitute a limitation on the broadest aspects of this invention. The synthetic paper of this invention can be converted into labels and similar articles commonly formed from conventional paper substrates.

BACKGROUND

From an ecological standpoint, it is highly desirable to conserve natural resources by employing synthetic films formed of plastics for uses in which conventional paper substrates are employed. Further, conventional paper substrates disintegrate in contact with water or chemically aggressive media like acids or oxidation agents. For many applications, e.g., labels, paper substrates are required to carry printed indicia applied by ink jet and similar print technology. The printed indicia need to be clear, without smudging or similar defects in order to be commercially acceptable.

Prior art films employed as synthetic papers have included liquid-based coatings employing fillers, including silica gel, with a polymer binder, which, when coated onto a polyolefin base substrate, do not adhere well to the substrate, tend to flake off the substrate, and are not compatible with many desired ink formulations. In these prior art coating formulations the silica gel and binder are dissolved in water or an organic solvent and applied as a dispersion.

Synthetic papers most competitive to natural paper are polypropylene (PP) films coated with 20 to 40% acrylic and urethane polymer binders containing in addition various percentages of fillers (silica gel, clay, alumina, talc, titanium dioxide, calcium carbonate) and dispersed in water or an organic solvent.

Various prior art documents disclose a number of different approaches for forming a printable surface on a polymer substrate.

WO 2017105404 discloses that an image receiving layer (that does not actually contact the image) needs to be coated with an abrasion resistant layer (that actually contacts the image) consisting of water soluble or water dispersible cross-linked urethane or epoxy binder with filler.

US 2008075869 A1 discloses a water/solvent based coating process in which the coating has a very low viscosity of less than 1000 centipoise before it is applied and dried. The active component in the coating is a fumed or colloidal form of metal oxide.

U.S. Pat. No. 5,332,548 mentions coating or impregnating a water/solvent-based material by spraying, dipping, brushing, spreading, printing and then drying.

U.S. Pat. No. 7,015,270 discloses a water-based coating formulation patent. The active component in the coating is a fumed metal oxide. Silica gel is one of many pigments identified in the patent, which optionally can be included, if desired.

U.S. Pat. No. 6,783,816 discloses inkjet coating including a water soluble binder.

U.S. Pat. No. 7,572,854 discloses water soluble binders in coatings that are applied to a substrate and dried.

US 0209758 A1 and 0065019 A1 each disclose a coated film in which the coating contains a particle with an average particle size of 5 to 20 microns; smaller and larger particles being undesirable. Standard coating processes are employed to apply the coating to the film, e.g., dip, spray, gravure, reverse gravure, air knife, rod, and/or offset and any combination thereof. The preferred particles in the coating have little or no porosity and are hydrophobic.

WO/98 49003 (1998), WO 02/090104 and WO/9414606 disclose the use of low levels of silica gel as a slip agent or anti-blocking agent. The addition level is commonly much lower than 1% and typically measured in parts per million. This is an inadequate level to provide a desired print surface for synthetic paper.

EP 191 970 5 discloses the use of silica gel in a UV coating to impart roughness. This is known to impart desired anti-blocking behavior or improved slip characteristics; having no bearing on providing a desired print surface for synthetic paper.

U.S. Pat. Nos. 4,892,779; 4,861,644 and 4,833,172 each disclose an extrusion process employing a technique called thermally induced phase separation used to process ultra-high molecular weight polyethylene where the polymer and filler are co-extruded with an oil or lubricant sufficient to facilitate extrusion of a cast film where the lubricant or oil is extracted and removed in subsequent processing. In this process it is expected that oil or lubricant would be adsorbed into the adsorbent silica and extraction may be very difficult because of the small pore size in the adsorbent silica which would render the adsorption capability of the adsorbent insufficient to act as an adsorbent for inkjet ink fluids during the printing process.

In regards to silica gel included in melt processed films the prior art generally discloses the use of silica forms (precipitated, colloidal, and gel) and other minerals in very low quantities as anti-blocking agents or slip modifiers. These levels do not provide the desired surface characteristics to enhance print quality; in particular inkjet print quality. To the applicant's knowledge there has been no recognition in the field of the unique surface structure obtained at loadings of silica-gel greater than 5%.

SUMMARY OF THE INVENTION

In accordance with a preferred embodiment of this invention a pre-compounded, solid blend of a polyolefin and adsorbent silica (not a water or solvent based coating) is employed in an extrusion process to extrude a desired top print layer on a base substrate to form a multilayer structure; most preferably with the top layer and base layer being coextruded. However, if desired, the blend of polyolefin and adsorbent silica can be extruded onto the base substrate in an extrusion coating process. In the case of biaxially oriented film extrusion such extrusion coating can be done i.e. between the machine direction and transverse direction stretching operations in the formation of the film. None of the embodiments of this invention requires the use of oils or lubricants to process the polymer matrix, generate pores or for any other purpose. Thus, no such substances need to be extracted subsequently, nor impair the access to the inner surface of such pores if not extracted completely.

It is within the broadest scope of this invention to form an extruded, single layer film in which the composition of the single layer is the same as the composition of the top print layer of a multilayer, extruded film of this invention, as is described in detail hereinafter.

In a preferred extruded multilayer film of this invention including a top layer comprising a blend of a polyolefin and adsorbent silica, said silica being at least 5% by weight of the blend, said multilayer film being oriented in at least one direction causing fracturing of said top layer to provide a microporous surface exposing the silica, said fractured top layer being receptive to receive a printing ink on an exposed surface thereof with enhanced pigment entrapment and rapid ink drying.

In a preferred embodiment, the adsorbent silica is present in the range of 5%-30%; more preferably in the range of 10%-25% by weight of the blend in the top layer and even more preferably in the range of 15%-20% by weight of the blend in the top layer.

In accordance with this invention acceptable print quality can be obtained either with or without prior oxidative treatment (e.g., corona, flame or plasma treatment) of the printable layer.

In the preferred embodiment of this invention the adsorbent silica employed in the blend includes pores having a diameter greater than 30 angstroms, preferably greater than 60 angstroms, and more preferably greater than 100 angstroms and most preferably in the range of 100 to 300 angstroms. While the pore size should be large to avoid capillary condensation of water at common environmental conditions, the surface area should also be high to facilitate high adsorption capacity. A method to determine the internal surface area of the adsorbent silica is commonly known as BET adsorption isotherm and is determined by ASTM D1993-03. Suitable adsorbent silicas provide an internal pore surface area as per BET adsorption isotherm of greater than 10 $m^2/g$, more preferably greater than 20 and even preferably greater than 50 $m^2/g$. Higher internal pore surface areas of greater than 100 $m^2/g$ but less than 700 $m^2/g$ are even more desirable, preferably between 200 and 700 $m^2/g$, and most preferably between 200 and 400 $m^2/g$.

Adsorbent silica expected to meet the pore size and surface area criteria would be those produced through a gel or precipitation process, commonly referred to as silica gel or precipitated silica. Silica gels and precipitated gels are known to those skilled in the art and do not require any further explanation.

Preferably the polyolefin in the polyolefin/adsorbent silica blend includes one or more polyolefins from the group consisting of polypropylene homopolymer, polyethylene including high density polyethylene, propylene/ethylene copolymers, propylene/ethylene/butene-1 terpolymers, maleated polypropylene and incompatible blends of a polypropylene with a polyethylene or another poly alpha-olefin or incompatible blends of polyethylene with another poly alpha-olefin or combinations thereof.

In a preferred embodiment a co-extruded, multilayer film includes a core layer, a top layer on one side of the core layer and including the blend of polyolefin/adsorbent silica therein and a bottom layer on the opposed side of the core layer, said bottom layer preferably being a bonding layer for permitting bonding of the multilayer film to another article.

In a preferred embodiment, the top layer including the blend of polyolefin/adsorbent silica therein also includes a void creating agent (e.g., calcium carbonate, polybutylene terephthalate), a whitening agent (e.g., titanium oxide), or a combination of both a void creating agent and whitening agent therein. If desired a colorant or pigment can be included in the top layer or any of the other layers to provide a desired color to that layer or layers.

The preferred multilayer films of this invention are polypropylene films, i.e., each layer including greater than 50% polypropylene therein.

A printable label formed from multilayer films of this invention also constitutes a part of this invention.

In a preferred embodiment, the adsorbent silica is present is in the range of 5-30%; more preferably 10-20% by weight and even more preferably in the range of 15-20% by weight of the blend in the top layer. The concentration in the blend is equal to or greater than the concentration in the skin layer.

DESCRIPTION OF COMPONENTS EMPLOYED IN THE INVENTION

Reference to a "polyolefin" in this application, unless stated otherwise, means a homopolymer, copolymer or terpolymer in which the predominant monomer components, by weight, are olefins.

Reference to "propylene polymer," unless indicated otherwise, means a propylene homopolymer ("Homo PP"), or a copolymer ("Copo") or a terpolymer ("Terpo") in which the predominant monomer component, by weight, is propylene.

Reference to "propylene terpolymer," unless indicated otherwise, means a terpolymer comprising propylene ("C3"), ethylene ("C2"), and butene-1 ("C4") monomer units in which propylene is the predominant monomer unit by weight.

Reference to "propylene copolymer," unless indicated otherwise, means a copolymer comprising propylene ("C3"), and ethylene ("C2"), or butene-1 ("C4") monomer units in which propylene is the predominant monomer unit by weight.

Reference to "propylene homopolymer," unless indicated otherwise means a homopolymer and also a propylene-ethylene copolymer in which the percentage of ethylene is so little that it doesn't adversely affect the crystallinity or other properties of the homopolymer. These copolymers are referred to as "mini-random" copolymers and have a percentage ethylene, by weight of the copolymer, of 0.8% or less.

Representative organic and inorganic materials usable in this invention, including the supplier, are:

| Description | Trade name | Supplier |
| --- | --- | --- |
| Homo PP | FF030F2 | Braskem |
| Copo (2.5 % C2) | R08G-00 | Ineos |
| Copo (2.5 % C2) | DS6D21 | Braskem |
| Copo (4.5 % C2) | DS6D82 | Braskem |
| Matt PP/PE blend | MT 0523 DP | Tosaf |
| Maleated Homo PP | Admer QF500A | Mitsui |
| Silica Gel | Syloid C805 | Grace Davison |
| CaCO3/PP masterbatch | PF97 | A. Schulman |
| TiO2 White masterbatch | P8266 | A. Schulman |

-continued

| Description | Trade name | Supplier |
|---|---|---|
| Precipitated silica | HL-SIL | PPG Industries |
| | Low-Vel | PPG Industries |

The above list is representative of useable components in this invention. However, similar components useable in this invention are provided by other suppliers and the above listing is not intended as an exclusive listing of usable components. For example, an alternative silica gel usable in this invention is sold under the tradename Silysia by Fuji Silysia Chemical. In addition, there are numerous suppliers of polypropylene homopolymers as well as other polyolefins usable in this invention.

The adsorbent silica and other additives can be combined in high concentrations with one or more polymers to form a masterbatch. The masterbatch may be used directly or mixed as a solid or melt with other polymers, additives, or masterbatches to form a blend that can be coextruded, extruded, or extrusion coated. For example, the masterbatch can include one or more additives from the group consisting of antistatic agents, slip agents, whitening agents, voiding agents, UV stabilizers, UV absorbers, antioxidants, and acid scavengers.

DESCRIPTION OF THE PREFERRED EMBODIMENTS OF THE INVENTION

An extruded multilayer film of this invention includes an extruded top layer comprising a blend of one or more polyolefins and adsorbent silica, said adsorbent silica being present in at least 5% by weight of the blend; over 50% of the blend, by weight, being the polyolefins. The multilayer film is oriented in at least one direction causing fracturing of said top layer to provide a microporous surface exposing the adsorbent silica, said fractured top layer being receptive to receive a printing ink on an exposed surface thereof with enhanced entrapment of the colorant in the ink and rapid ink drying. The printing ink can be applied in discontinuous or continuous coating. Other coatings could also be applied and benefit from enhanced entrapment of colorant in the ink, more rapid coating drying, and/or better coating adhesion. In the most preferred embodiments of this invention the adsorbent silica is a silica gel. However, within broader aspects of this invention the adsorbent silica can be a precipitated silica.

Preferred are blends of polyolefins and adsorbent silica with said silica being present in the range of 5% to 30% by weight of the blend; more preferably in the range of 10% to 30%, even more preferably in the range of 10% to 20% by weight of the blend and most preferably in the range of 15% to 20% by weight of the blend that is melt extruded as the top layer of the multilayer structure.

Numerous benefits are provided by employing an adsorbent silica embedded in a polyolefin surface as described above. The blends of this invention, when melted and extruded to form the top layer of the film provide improved printability relative to water or solvent based blends employed as a coating to form a top surface. A benefit of the preferred coextruded embodiments of this invention is that the top layer intimately bonds with the base layer as a result of the co-extrusion of the melts, thereby minimizing the likelihood of undesired flaking of the top, printable layer from the base layer. Such flaking is likely to occur in prior art structures employing water or solvent based coatings. Moreover, olefin binders of this invention are not sensitive to water or solvent exposure, so printing of the top surface is more durable than films with other types of top layers. In addition, the olefin binder blends of this invention are not brittle, and also provide a strong bond to the supporting base layer so the print skin is unlikely to crack. Furthermore, the co-extrusion of the olefin/silica gel skin layer with a base layer in accordance with the most preferred embodiment of this invention is more cost effective than applying water or solvent based coating of the silica gel as a top layer.

In accordance with this invention, the silica must be an adsorbent silica; not, a fumed, colloidal, calcined, fused, pyrogenic, or crystalline silica, nor any other type of silica with little adsorbent properties. Adsorbent silica, unlike other forms of silica, has a desired internal porosity to help adsorb the printing ink solvents employed in an inkjet printing or similar operation. It also is important that the pore size be large enough so that moisture adsorption of water from ambient surroundings does not adversely affect the extrusion operation or the print quality of the print-receiving layer.

In a preferred embodiment of this invention the adsorbent silica employed in the blends is a silica gel including pores having a size (diameter) greater than 30 angstroms, preferably greater than 60 angstroms, more preferably greater than 100 angstroms and most preferably in the range of 100 to 300 angstroms therein. Preferred size of the silica gel particles is 0.5 to 5 microns. These pore and particle sizes are very desirable features of the most preferred embodiments of this invention.

To ensure rapid drying it is desirable to use adsorbent silica of a large internal pore surface area. However, there is a trade-off between the internal surface area and the pore size. When the internal surface area exceeds 700 $m^2/g$ the pore size becomes so small that the adsorbent silica becomes capable of condensing water from common humid environmental air conditions. This results in filling the pores with water and leaving reduced capacity to adsorb liquids associated with the ink. This critical level of internal pore surface area is commonly observed when the pore size is less than 30 angstroms. A method to determine the internal surface area of the adsorbent silica is commonly known as BET adsorption isotherm. Suitable adsorbent silicas provide an internal pore surface area as per BET adsorption isotherm of greater than 10 $m^2/g$, more preferably greater than 20 and even preferably greater than 50 $m^2/g$. Higher internal pore surface areas of greater than 100 $m^2/g$ but less than 700 $m^2/g$ are even more desirable, preferably between 200 and 700 $m^2/g$, and most preferably between 200 and 400 $m^2/g$.

Adsorbent silica expected to meet these criteria would be those produced through a gel or precipitation process, commonly referred to as silica gel or precipitated silica, respectively.

As is known in the art, a correlation exists between pore volume and pore diameter; pore volume being easily measured by the weight increase through the absorption of oil. An empirical correlation between pore volume and pore diameter is known to those skilled in the art. For example, in a Fuji Silysia Chemical, Ltd. publication a table is presented stating that a pore volume of 1.8, 1.6, 1.25, 0.8, and 0.44 ml/g of adsorbent silica corresponds to a pore diameter of 240, 210, 170, 70, and 25 Angstrom, respectively. Preferred are adsorbent silica grades including pores of a diameter greater than 30 angstrom, preferably greater than 60 angstroms, and more preferably greater than 100 angstroms and most preferably from 100 to 300 angstroms. The physical properties of the adsorbent silica, including but not limited to pore size and particle size, can be altered by changing production conditions. For example, the pore size desirable for employing silica as an anti-block agent or a slip agent is extremely small; well outside the desired range for achieving accepted, commercial print quality, as applicant has discovered in this invention.

Numerous other additives, well-known in the art, can be added to the top layer, if desired. For example, and not be way of limiting the broadest aspects of this invention, these additives can include antistatic agents like ethoxylated amines, slip additives like erucamide, UV stabilizers and UV absorbers, antioxidation agents, acid scavengers, voiding agents and pigments like poly butylene terephthalate and titanium dioxide, as well as other agents as desired.

In accordance with this invention acceptable print quality can be obtained either with or without oxidative treatment of the top, printable layer; depending on the dyne level of that layer. "Dyne level" is the surface tension of a solvent that is able to wet the surface of the open-porous top layer through interacting either with the polar surface of the adsorbent silica;

most preferably silica-gel particles, or with polar groups on the surface of the top layer, when the top layer is oxidatively treated. The test method for determining the dyne value is ASTM D2578-09. Specifically, it is desirable to achieve a dyne level, tested after 1 week of aging or more, greater than 35, preferably greater than 38, more preferably 41. To provide desired wettability of the surface layer for receiving and retaining water-based ink jet ink even more efficiently a dyne level of 44 and most preferably greater than 50 is desirable. The dyne value can be increased by increasing the amount of adsorbent silica in the blend and also by oxidatively treating the top layer; most preferably by corona treatment. If the amount of adsorbent silica in the blend provides a dyne value in excess of 50 it may not be necessary to also oxidatively treat the print surface. On the other hand, if the amount of adsorbent silica in the blend provides a dyne value regarded as being too low, meaning less than 50 or even 43, then the surface can be oxidatively treated to provide the desired dyne value to achieve acceptable print quality.

Preferably the polyolefin employed in the blend of polyolefin and adsorbent silica of this invention is one or more of the polyolefins from the group consisting of polypropylene homopolymer, polyethylene including high density polyethylene, propylene/ethylene copolymers, maleated polypropylene, and incompatible blends of a polypropylene with a polyethylene or another poly alpha-olefin or incompatible blends of polyethylene with another poly alpha-olefin and propylene/ethylene/butene-1 terpolymers and combinations thereof.

In a preferred embodiment of this invention, a co-extruded, multilayer film is a two or three layer structure including a core or base layer, a top layer including the blend of polyolefin/adsorbent silica therein on one side of the core, or base, layer, and, optionally, a bottom layer on the opposed side of the core or base layer, said optional bottom layer preferably being a bonding layer for facilitating bonding of the multilayer film to itself through heat sealing to, e.g., form flexible packaging.

In another preferred embodiment the face of the core or base layer opposite the face comprising the layer including the blend of polyolefin/adsorbent silica, or the optional bottom layer is designed for the application of a suitable adhesive to bond to another article. For example, the multilayer film can be converted into a flexible packaging by bonding to itself through the application of a cold seal adhesive, or into product labels for attachment to packaging for the product through the applied adhesive.

The compositions of bonding layers suitable for various purposes are well-known in the art and do not constitute a limitation on the broadest aspects of this invention. For example, the bonding layer can be a cold seal layer, a heat seal layer or a pressure sensitive layer. Such layers are disclosed in numerous patents, and are well known to those skilled in the art. For example, and not by way of limitation, heat sealing resins can include Eltex P KS409 from Ineos, a C2C3 copolymer having a melting point of 134 C, DS6D82 from Braskem, a C2C3 copolymer having a melting point of 133C, Eltex P KS 359 from Ineos, a C2C3C4 terpolymer having a melting point of 134C, and Adsyl 5C39F from LyondellBasell, a C2C3C4 terpolymer having a melting point of 134C. Exemplary cold seal adhesives are Turbo-seal C1775B manufactured by Bostik and Loctite Liofol CS22-861US1 manufactured by Henkel. Examples of pressure sensitive adhesives include Aroset 2529 from Ashland Chemical or Covinax 300-01 from Franklin Adhesives and Polymers. These are only exemplary of the numerous cold seal and pressure sensitive adhesives that can be used in this invention.

In another preferred embodiment a co-extruded, multilayer film comprises at least three layers including a core or base layer, a top layer including the blend of polyolefin/adsorbent silica on one side of the core or base, layer, a bottom layer on the opposed side of the core or base layer, said bottom layer comprising a blend of non-compatible polymers, i.e. a polyethylene and a polypropylene, with a rough surface morphology, said bottom layer being a bonding layer for facilitating bonding or attachment to an injection molded, blow-molded, or thermoformed article in an in-mold label (IML) process. For example, the multilayer film can be converted into IML product labels for attachment to packaging for the product through the bottom bonding layer.

In another preferred embodiment a co-extruded, multilayer film comprises at least four layers including a core or base layer, a top layer including the blend of polyolefin/adsorbent silica on one side of the core or base, layer, a bottom layer on the opposed side of the core or base layer, and a tie layer between the core layer and the bottom layer. In a more preferred embodiment the tie layer between the core layer and the bottom layer comprising a maleated polypropylene, said bottom layer comprising one or more polyamides preferably used as being a bonding layer for facilitating bonding of the multilayer film to another article. The multilayer film of such embodiment can be converted into pressure sensitive product labels for attachment to packaging for the product through the bottom bonding layer.

In preferred embodiments of this invention the base layer of said two, three, four, or five layer films is thicker than any of the top or bottom layers. Also preferred are such embodiments that employ more than 50% by weight of polypropylene in each of the layers.

It is within the scope of this invention to employ the printable top layer in structures including 1, 2, 3, 4, or 5 or more layers; neither the number of layers nor whether said structures are translucent or opaque constituting a limitation on the broadest aspects of this invention.

In accordance with this invention a tie layer can be employed to improve the adhesion of the adsorbent silica-containing top layer to the core layer, and/or the adhesion of the core layer to the lower bonding layer. Tie layer materials that are known improve the adhesion between dissimilar materials and include maleated polypropylene such as Admer QF500A sold by Mitsui. Tie layers such as polypropylene between the adsorbent silica-containing layer and a voided core may also be included on either or both sides of voided a core to improve stiffness.

In accordance with this invention, the top layer including the blend of polyolefin/adsorbent silica therein also can include a void creating agent (e.g., calcium carbonate or poly butylene terephthalate), a whitening agent (e.g., titanium oxide), or a combination of both a void creating agent and whitening agent therein. Representative void creating agents and whitening agents are PF97 and P8266 from A. Schulman, respectively, as identified in the earlier presented chart identifying components usable in this invention. The void creating agent and polyolefin are added in the form of the identified blend or as separate components. However, when a void creating agent is used, it is preferred to include it in the blend/masterbatch.

In a preferred embodiment of this invention a coextruded three-layer film of paper-like appearance is oriented in at least one; preferably in 2 directions, with an exposed top layer, a base or core layer and an exposed bottom layer on the opposite side of the core layer. In this preferred embodiment the film is characterized in that the core layer comprises a voiding agent, preferably polybutylene terephthalate, and optionally a whitening agent, and is thicker than the exposed top or bottom layers. The top layer is a polyolefin/adsorbent silica blend. The polyolefin includes a blend of a one or more polymers from the group consisting of polypropylene homopolymer, polyethylene including high density polyethylene, propylene/ethylene copolymers, maleated polypropylene, incompatible blends of propylene and ethylene polymers or propylene and another alpha-olefin, incompatible blends of ethylene with another alpha-olefin, and propylene/ethylene/butene-1 terpolymers and combinations thereof. Preferably the polyolefin in the top layer is a polypropylene or more preferably a propylene ethylene copolymer. The polyolefin in the top layer is present in a weight percentage of 95 to 70%, preferably 90 to 75% and more preferably 85 to 80% by weight, and the adsorbent silica is present in a weight percent of 5 to 30%, preferably 10 to 25% and more preferably 15-20%, respectively. Preferentially the adsorbent silica is a silica gel including pores having a diameter of at least 30 angstroms, preferably greater than 60 angstroms, more preferably greater than 100 angstroms and most preferably in the range of 100 to 300 angstroms therein. Each of the core and the bottom layer comprise more than 50% by weight of polypropylene. Said bottom layer of said coextruded oriented three-layer film of paper-like appearance is a bonding layer for permitting bonding of said three-layer film itself a through heat sealing or through application of a cold seal adhesive to, e.g., form flexible packaging, or bonding to another article directly or through application of an adhesive.

Optionally, said exposed top layer may be oxidatively treated, preferably corona treated, in order to increase its wettability.

In another preferred embodiment said top layer of said coextruded oriented three-layer film of paper-like appearance comprises additionally a whitening agent and optionally a voiding agent.

In yet another preferred embodiment of this invention a coextruded five-layer film of paper-like appearance is oriented in at least one; preferably in 2 directions, with a base or core layer, an exposed top layer, a top tie layer between said top layer and said core layer, an exposed bottom layer on the opposite side of the core layer and a bottom tie layer between said top layer and said core layer, characterized in that said core layer comprises a voiding agent, preferably polybutylene terephthalate, and optionally a whitening agent, and is thicker than said exposed top or bottom layers. The top layer is a polyolefin/adsorbent silica blend. The polyolefin includes a blend of a one or more polymers from the group consisting of polypropylene homopolymer, polyethylene including high density polyethylene, propylene/ethylene copolymers, maleated polypropylene, incompatible blends of propylene and ethylene polymers or propylene and another alpha-olefin, incompatible blends of ethylene with another alpha-olefin, and propylene/ethylene/butene-1 terpolymers and combinations thereof. Preferably the polyolefin in the top layer is a polypropylene or more preferably a propylene ethylene copolymer. The polyolefin in the top layer is present in a weight percentage of 95 to 70%, preferably 90 to 75% and more preferably 85 to 80% by weight, and the adsorbent silica is present in a weight percent of 5 to 30%, preferably 10 to 25% and more preferably 15-20%, respectively. Preferentially the adsorbent silica is a silica gel including pores having a diameter of at least 30 angstroms, preferably greater than 60 angstroms, more preferably greater than 100 angstroms and most preferably in the range of 100 to 300 angstroms therein. The top tie layer optionally comprises a whitening agent and, as another option, additionally a voiding agent, and each of the core and the top tie layer comprise more than 50% by weight of polypropylene. Optionally, said exposed top layer may be oxidatively treated, preferably corona treated, in order to increase its wettability.

In another preferred embodiment said top layer of said coextruded oriented five-layer film of paper-like appearance comprises additionally a whitening agent and optionally a voiding agent.

The bottom tie layer between the core layer and the bottom layer of said coextruded oriented five-layer film of paper-like appearance comprises a polyolefin, preferably a polypropylene, most preferably at least 50% by weight of a polypropylene and optionally a whitening agent and, as another option, additionally a voiding agent. The bottom layer of this coextruded five layer film comprises more than 50% by weight of polypropylene, preferably a propylene ethylene copolymer, and constitutes a bonding layer for permitting bonding of said five-layer film through heat sealing or through application of a cold seal adhesive to said bonding layer, e.g., to form flexible packaging, or bonding to another article directly or through application of an adhesive to said bonding layer.

In another preferred embodiment said bottom tie layer between the core layer and the bottom layer comprises a maleated polypropylene, said bottom layer, comprising one or more polyamides; preferably is used as a bonding layer for facilitating bonding of the multilayer film to another article. The multilayer film of such embodiment can be converted into pressure sensitive product labels for attachment to packaging for the product through the bottom bonding layer.

It has been discovered that employing the blend of polyolefin/adsorbent silica as the top layer, without any void creating or whitening agents therein, provides a lucent, printable top layer. The lucent layer is not a crystal-clear layer in that it is somewhat foggy or icy, having a general matte appearance. However, the lucent layer is visually transparent; permitting individuals to view through it.

In the most preferred multi-layer embodiments of this invention the layers in addition to the top layer are free of void creating and/or whitening agents. When the top layer also is free of any void creating or whitening agents the entire multi-layer film is translucent in a way frequently identified as contact transparency; permitting the viewing of text through the film.

Another preferred embodiment of this invention is a coextruded multi-layer film of translucent appearance oriented in at least one; preferably in 2 directions, with an exposed top layer, a base or core layer and an exposed bottom layer on the opposite side of the core layer, and optionally with tie layers between the core layer and the top layer, and between the core layer and the bottom layer, characterized in that said core layer is thicker than said exposed top or bottom layers. The top layer is a polyolefin/adsorbent silica blend. The polyolefin includes a blend of a one or more polymers from the group consisting of polypropylene homopolymer, polyethylene including high density polyethylene, propylene/ethylene copolymers, maleated polypropylene, incompatible blends of propylene and ethylene polymers or propylene and another alpha-olefin, incompatible blends of ethylene with another alpha-olefin, and propylene/ethylene/butene-1 terpolymers and combinations thereof. Preferably the polyolefin in the top layer is a polypropylene or more preferably a propylene ethylene copolymer. The polyolefin in the top layer is present in a weight percentage of 95 to 70%, preferably 90 to 75% and more preferably 85 to 80% by weight, and the adsorbent silica is present in a weight percent of 5 to 30%, preferably 10 to 25% and more preferably 15-20%, respectively. Preferentially the adsorbent silica is a silica gel including pores having a diameter of at least 30 angstroms, preferably greater than 60 angstroms, more preferably greater than 100 angstroms and most preferably in the range of 100 to 300 angstroms therein. Each of the core and the optional tie layer comprises more than 50% by weight of polypropylene.

Optionally, said exposed top layer may be oxidatively treated, preferably corona treated, in order to increase its wettability.

The bottom tie layer between the core layer and the bottom layer of said coextruded oriented five-layer film of translucent appearance comprises a polyolefin, preferably a polypropylene, and most preferably at least 50% by weight of a polypropylene. The bottom layer of this five-layer structure, comprises more than 50% by weight of polypropylene, preferably a propylene ethylene copolymer, and constitutes a bonding layer for permitting bonding of said multi-layer film itself a through heat sealing or through application of a cold seal adhesive to said bonding layer, e.g., to form flexible packaging, or bonding to another article directly or through application of an adhesive to said bonding layer.

In another preferred embodiment said bottom tie layer between the core layer and the bottom layer comprises a maleated polypropylene, and said bottom layer, comprising one or more polyamides, is preferably used as being a bonding layer for facilitating bonding of the multilayer film to another article. The multilayer film of such embodiment can be converted into pressure sensitive product labels for attachment to packaging for the product through the bottom bonding layer.

A printable label formed from any of the multilayer films of this invention also constitutes a part of this invention.

Also included in this invention is a solid, particulate blend, or masterbatches, for use in extruding a film layer, said blend including 95% to 55% polyolefin and 5% to 45% adsorbent silica; more preferably 85% to 70% polyolefin and 15% to 30% adsorbent silica. These blends optionally include one or more additives from the group consisting of antistatic agents, slip agents, whitening agents, voiding agents, UV stabilizers, UV absorbers, antioxidants, and acid scavengers. These blends are used to extrude as a printable layer of a multilayer film and labels made from such film and are solid prior to being melted in the extruder, and therefore do not include any water or liquid solvent carrier. These blends, as far as they are formulated without, and free of whitening or voiding agents, are also used to extrude as a printable layer of a translucent multilayer film and labels made from such film.

The following are non-limiting examples of products within the scope of this invention

EXAMPLES

Example 1

A master batch consisting of 25%, by weight, silica gel (Syloid C 805) from Grace Davison and 75%, by weight, propylene/ethylene copolymer (propylene copolymer comprising 2.5% of ethylene: Ineos RO8G-00) was compounded on a vented twin screw extruder (a ZE75R UTX x56D line from Berstorff, equipped with a melt pump, screen changer, diverter valve, and underwater pelletizer) with the copolymer (Copo) conventionally fed through the extruder throat. Specifically, the silica gel was fed using two feeders, both Brabender DDSR60 twin screw powder feeders with 65 mm and 75 mm pitch concave intermeshing screws. The material was pelletized using a Gala EAC 6 with a 48 hole die. The first pass achieved a 10% silica gel content with 5% from each feeder. This 10% compounded material was fed again though the extruder throat in a second pass resulted in a 20% silica gel content again with the addition evenly split between the two feeders. The third pass increased the silica gel content to 25% with the addition of 5% silica gel from only one of the feeders.

The polymer pellets were dried at 70C at −40C dew point. The 25% silica gel masterbatch was then blended with pellets of AMPLIFY EA100 (Dow Chemical), an ethylene-ethyl acrylate copolymer. The resulting mixture was 21% Silica gel, 16% AMPLIFY, and 63% propylene/ethylene copolymer. The blend was co-extruded with a base layer of homopolymer polypropylene (H03G06 from Ineos) as a skin layer of a cast sheet. The target thickness of the whole cast sheet was 1000 microns, of the skin 200 micron. The cast sheet was cooled on a pair of 60C chill roll. The cast sheet was heated on a couple of rollers to 135C and stretched 5× in the machine direction between 2 rollers heated to 135C running at different speeds and then pre heated to 175C in the tenter oven and stretched 10× at 153C. The biaxially oriented film was then annealed at 162C.

Separate samples of this film were formed; one being corona treated on the silica gel skin side and the other being untreated on the silica gel skin side.

Example 2

The 25% silica gel master batch pellets from Example 1 were blended with pellets of maleated PP (Admer QF 500A from Mitsui). The blend resulted in a composition of 12.5% Silica gel, 50% maleated PP, and 37.5% propylene/ethylene copolymer. The blend was co-extruded with a base layer of homopolymer polypropylene (H03G06 from Ineos) as a skin layer of a cast sheet. The target thickness of the whole cast sheet was 1000 microns, of the skin 200 micron. The cast sheet was cooled on a pair of 60C chill roll. The cast sheet was heated to 135C on a couple of rollers and stretched 5× in the machine direction between 2 rollers heated to 135C running at different speeds and then pre heated 175C and stretched 10× at 153C and then annealed at 162C. Separate samples of this film were formed; one being corona treated on the silica gel skin side and the other being untreated on the silica gel skin side.

Example 3

A master batch consisting of 10% silica gel (Syloid C 805) from Grace Davison and propylene/ethylene copolymer (Ineos RO8G-00) was compounded with the vented twin screw extruder described in Example 1. The copolymer resin was fed into the vented twin screw extruder using Brabender single screw FW80/6 Plus. The silica gel was fed into the vented twin screw extruder using two Brabender DDSR60 twin screw feeders with 65 mm and 75 mm pitch concave intermeshing screws. The material was pelletized using a Gala EAC 6 with a 48 hole die with 0.110" (2.80 mm) diameter holes in a single hole pattern. The first pass achieved a 10% silica gel content with 5% from each feeder. The polymer pellets were dried at 70C at −40C Dew point. The blend was co-extruded with a base layer of homopolymer polypropylene (H03G06 from Ineos) as a skin layer of a cast sheet. The target thickness of the whole cast sheet was 1000 microns and of the skin was 200 microns. The cast sheet was cooled on a pair of 60C chill roll. The cast sheet was heated to 135C on a couple of rollers and stretched 5× in the machine direction between 2 rollers heated to 135C running at different speeds and then pre heated 175C and stretched 10× at 153C and then annealed at 162C. Separate samples of this film were formed; one being corona treated on the silica gel skin side and the other being untreated on the silica gel skin side.

Example 4

The 10% silica gel master batch from Example 3 was blended with maleated PP (Admer QF 500A from Mitsui). The blend resulted in a composition of 5% Silica gel, 50% maleated PP, and 45% propylene/ethylene copolymer (R08G-00 from Ineos). The blend was co-extruded as a skin layer on a cast sheet of HomoPP H03G06 (Ineos). The blend was co-extruded with a base layer of homopolymer polypropylene (H03G06 from Ineos) as a skin layer of a cast sheet. The target thickness of the whole cast sheet was 1000 microns, of the skin 200 micron. The cast sheet was cooled on a pair of 60C chill roll. The cast sheet was heated to 135C on a couple of rollers and stretched 5× in the machine direction between 2 rollers heated to 135C running at different speeds and stretched 5× in the machine direction and then pre heated 175C and stretched 10× at 153C and then annealed at 162C. Separate samples of this film were formed; one being corona treated on the silica gel skin side and the other being untreated on the silica gel skin side.

The films of Examples 1–4 were tested for surface energy, ink adhesion, and ink jet printability. The results are summarized in Table 1.

TABLE 1

| Example | % Silica | Corona Treated | Dynes | InkJet Smearing t = 5 min |
|---|---|---|---|---|
| Commercial Label Film | 0 | yes | 38 | severe |
| 1 | 20 | yes | >68 | none |
| 1 | 20 | no | >68 | Slight |
| 2 | 13 | yes | >68 | slight |
| 2 | 13 | no | 34 | moderate |
| 3 | 10 | yes | >68 | moderate |
| 3 | 10 | no | 33 | significant |
| 4 | 5 | yes | 43 | significant |
| 4 | 5 | no | 30 | significant |

Surface energy (in dynes) was measured using dyne solution test used to measure the corona or flame treatment level of BoPP films. In such films, the higher surface energy is generally desirable as it assures that the ink can readily spread on the film surface. Corona treated high PP content surfaces are wetted by solutions of below 50 dynes and generally of 35 to 45 dynes. Flame treated high PP content surfaces are wetted by solutions of less than 60 dynes, typically 45 to 55 dynes. In Table 1 the corona treated layer containing greater than 10% silica gel showed extremely high surface energies of >68 dynes (the testing limit). Interestingly even the untreated samples with 10% or greater silica gel in the top layer showed dynes values common in corona treated high polypropylene content surfaces.

Additionally, the film samples were taped to a piece of paper to enable feeding into an HP Officejet 4635 with an HP Ink cartridge 61 (Product #B4L04A). An image of 7 colored lines (red, purple, blue, green, yellow, orange, red/orange) was printed on each of the samples. This same, 7 color printing was applied to an actual paper sample and to a commercial synthetic paper sample. After 5 minutes a Q-tip swab was wiped across each colored line to assess the degree of smearing. Photographs of these samples (omitting ink color) are included in FIG. 1 and the results (except for the actual paper sample) are specified in Table 1 above.

Figure 1A:
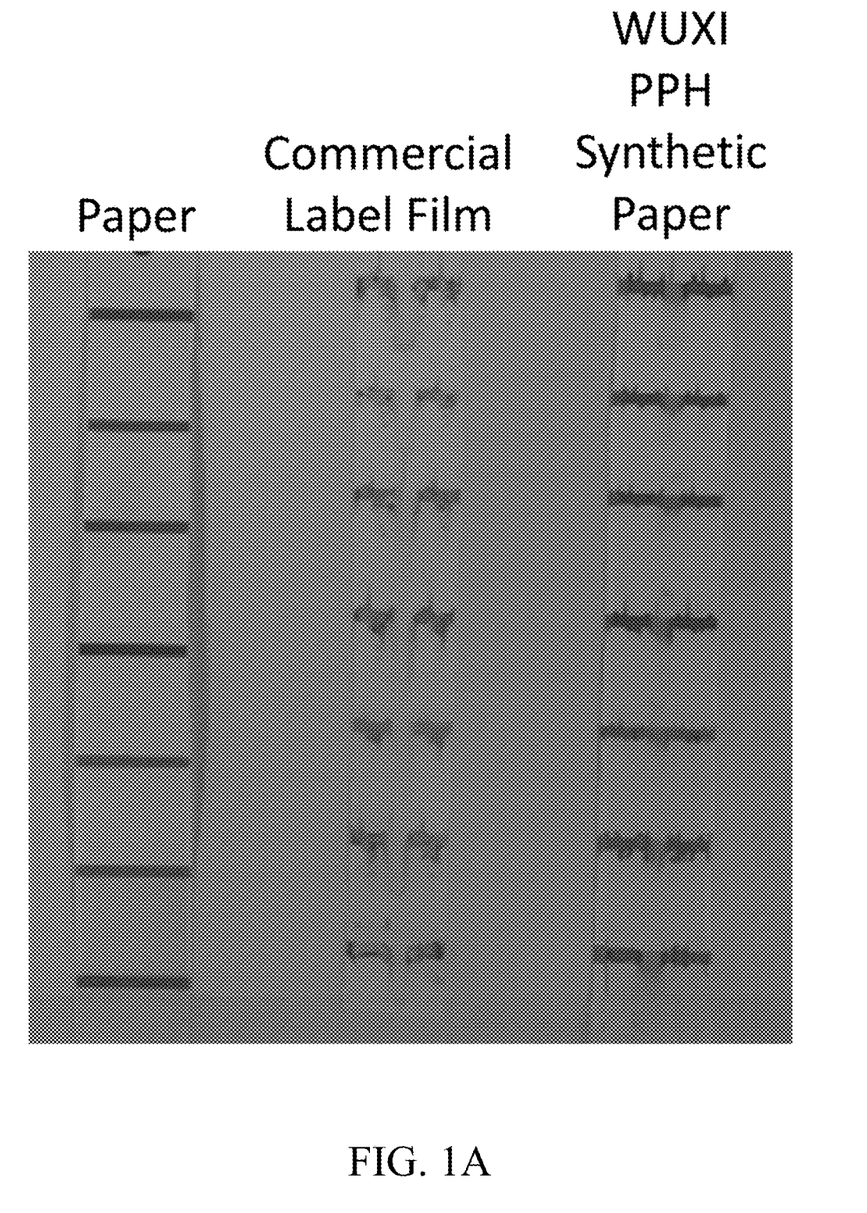
FIG. 1 includes photographs showing ink spreading and smearing properties of eight examples of this invention in comparison to the ink spreading and smearing properties of three prior art structures.
Figure 1B:
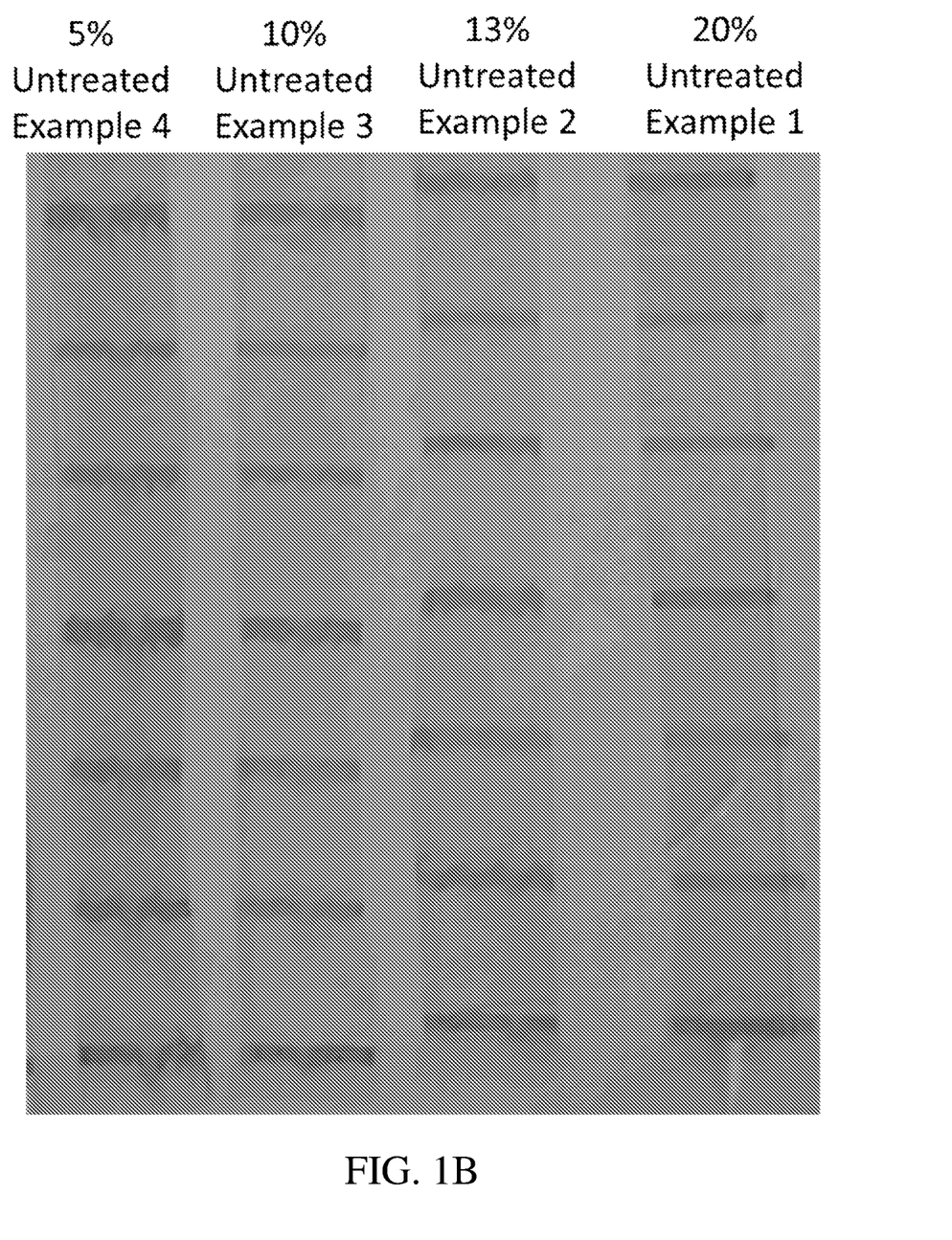
Figure 1C:
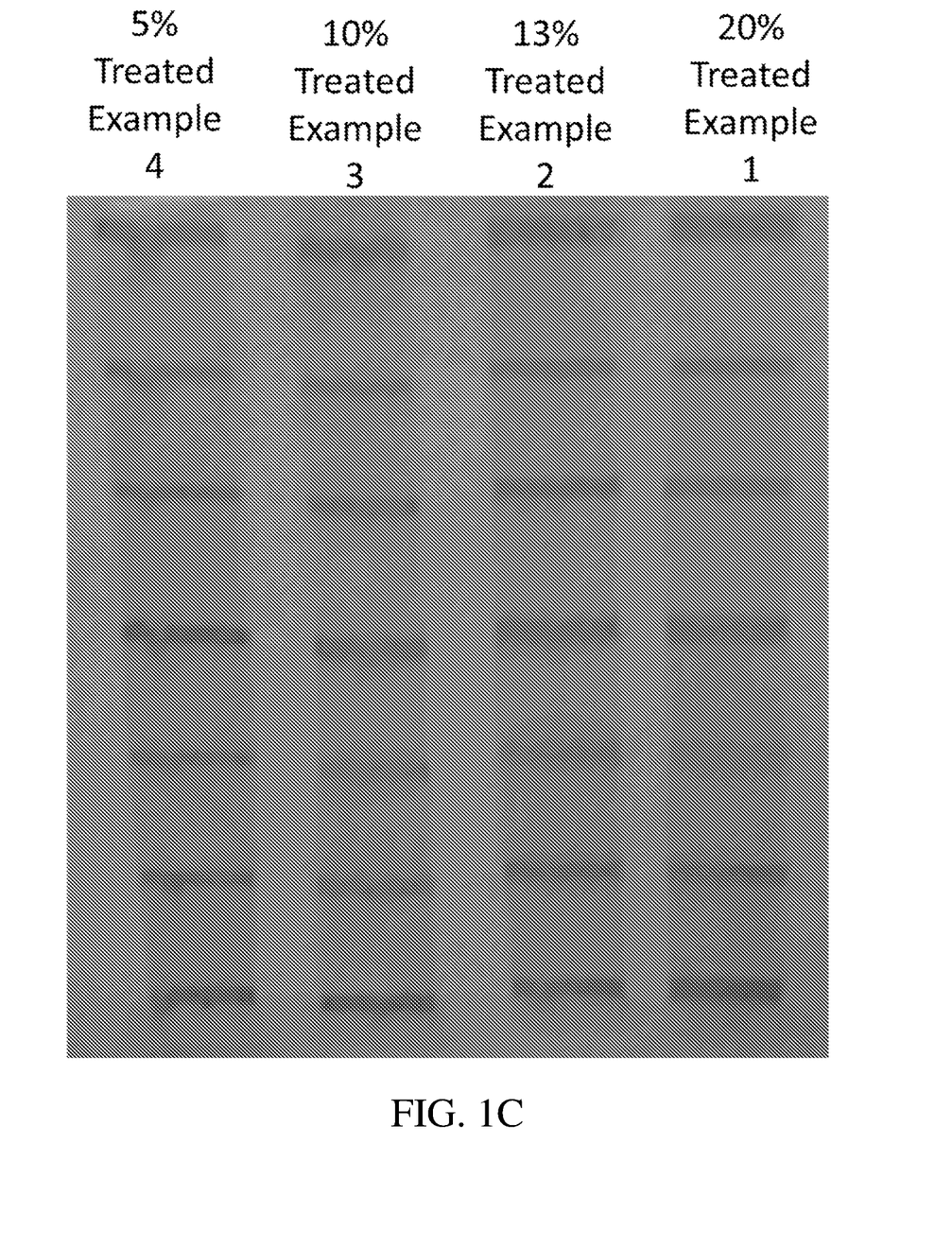

The ranking from worst performance to best performance was: severe, significant, moderate, slight, and none. The office paper control (the sample identified as "Paper") showed no smearing (none), as can be seen in the photograph.

As a comparison a commercial film stock (LIX 60 from applicant) specifically formulated for excellent print performance also was tested. A photograph of this commercial film is shown above and the test results are reported in Table 1 above as well.

While the 20% silica gel treated and untreated film surfaces of this invention were the best, with no evidence of smearing after 5 minutes and possessing good initial line image quality, even the 5% silica gel surface delivered improved performance over the LIX60 commercial label film and several of the 10 commercial synthetic papers evaluated, as discussed in greater detail below. The ink jet printing performance of the surface improved with increased silica gel content.

In this invention, applicant discovered a feature that was totally unexpected and that was contrary to the conventional understanding in the field, as is explained hereinafter.

Specifically, water contact angle commonly is used to characterize the extent of wettability between a surface and a liquid.

Generally, for a printable surface it has always been thought desirable to have a low water contact angle so that the ink readily wets the surface and good adhesion is achieved. Consequently, and based on this latter understanding, for polyolefin films the surface to be printed in commercial, synthetic films commonly has been oxidized with flame, corona, or plasma treatment to reduce the contact angle; with the belief that print quality would be improved, The contact angle is measured by placing a 2 microliter drop of water on the film surface, waiting 25 seconds, and then measuring the angle between the solid surface and liquid. Measurement can be made with a goniometer, such as the DSA 25 model sold by Kruss of Hamburg, Germany.

If the contact angle is less than 90 degrees the surface is wetted by the liquid; which was believed to be an indication that print quality would be good.

This prior art thinking is exemplified in following ten (10) commercial, printable films identified in Table 2, below.

TABLE 2

| Commercial Synthetic Papers | Water Contact Angle (Deg) | Wetting Solution (Dynes) |
| --- | --- | --- |
| PG Grade-77 Golden Dynamic | 51 | 68 |
| Dunmore SP19071 270DK | 39 | 68 |
| Golden Dynamic PEPA-PI-80 | 64 | 68 |
| HOP XS | 83 | 40 |
| HMS/DPAEK | 97 | 68 |
| HOP XT | 56 | 68 |
| Ouli Quickdry | 85 | 68 |
| Ouli PGA-75 | 81 | 68 |
| UMP Raflatac TC RP37 | 96 | 68 |
| WUXI | 96 | 68 |
| Average | 76 | 68 |

As shown, the average value of water contact angle for the above commercial synthetic papers is only 76 degrees, which is consistent with the general expectation that printability is improved if the water contact angle is less than 90 degrees.

Figure 2A:
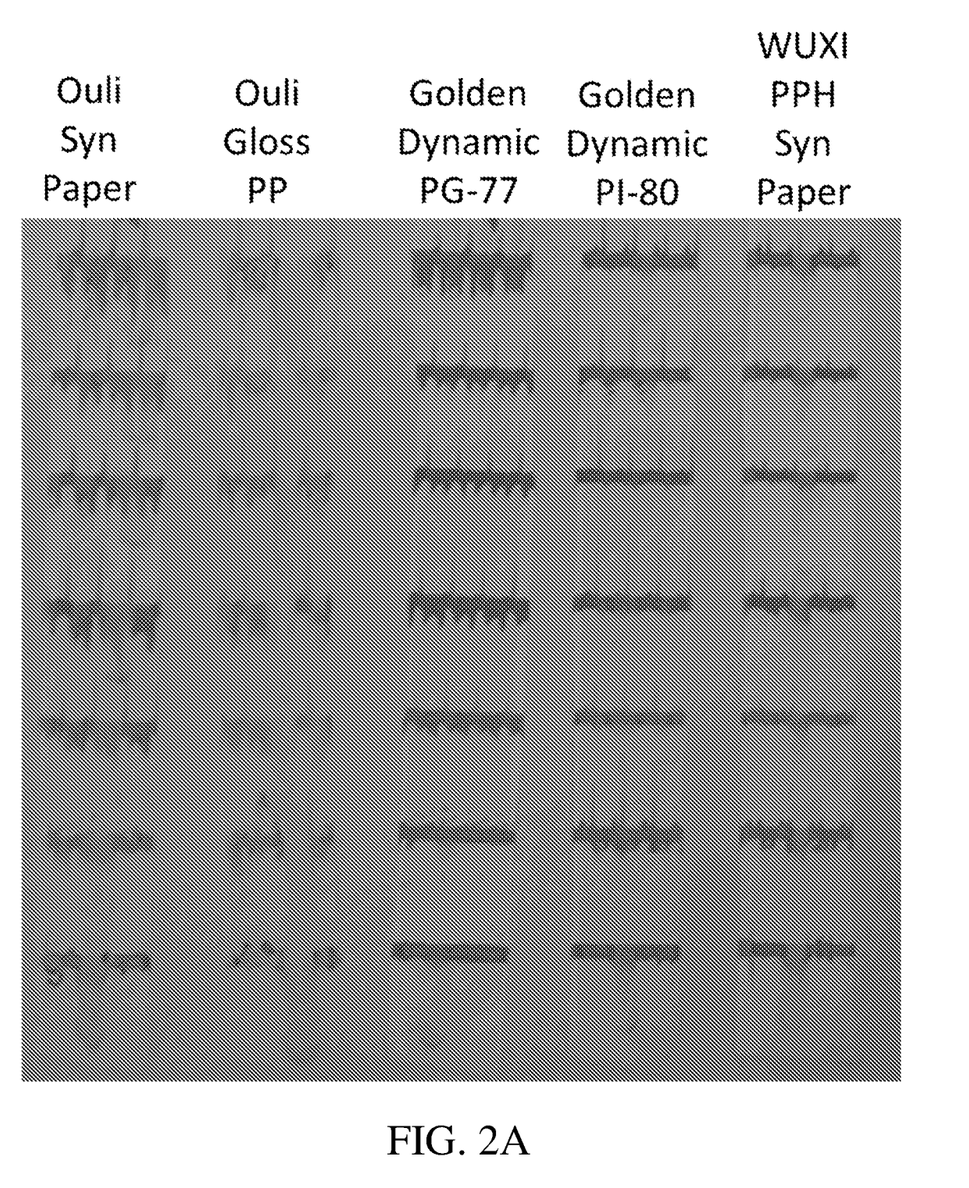
FIGS. 2A and 2B include photographs of 10 commercial synthetic papers.
Figure 2B:
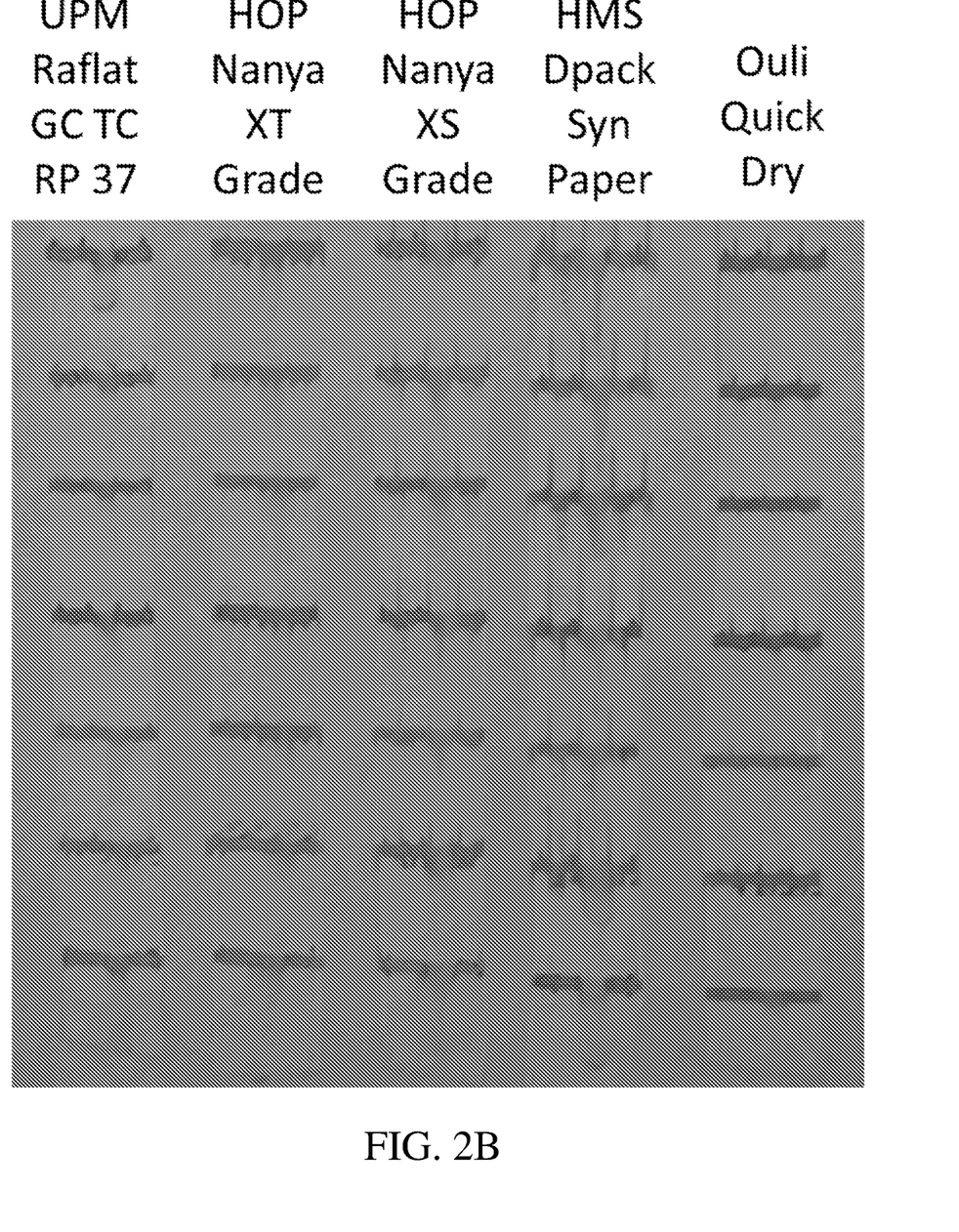

The ten commercial synthetic papers identified above are polypropylene based films coated with polymer binder and fillers. These commercial synthetic papers also where tested for smearing. Photographs of these ten commercial samples (two sets of 5 photographs) are shown in FIGS. 2A and 2B. Table 3 below includes a ranking of the smear properties of the ten commercial samples shown in FIGS. 2A and 2B.

TABLE 3

| Commerical Synthetic Papers | Ink jet Smearing t = 5 min |
| --- | --- |
| Ouli Synthetic Paper | Severe |
| Ouli Gloss PP | Severe |
| Golden Dynamic PG-77 | Significant |
| Golden Dynamic PI-88 | Significant |
| WUXI PPH Synthetic Paper | Significant |
| UPM Raflatac GC TC RP 37 | Moderate |
| HOP Nanya XT Grade | Significant |
| HOP Nanya XS Grade | Significant |
| HMS Dp ack Synthetic Paper | Severe |
| Ouil Quick Dry | Moderate |

As is apparent from a comparison of the photographs of the ten commercial synthetic papers in FIGS. 2A and 2B with the photographs of the films of this invention in FIG. 1, this invention provides substantially better print qualities than the identified commercial synthetic papers; particularly with respect to ink smearing. It is difficult to balance the need for ink smear resistance, which is related to adsorption of the ink liquids, against the need to avoid the undesirable lateral spread of ink, which can impair image quality. Generally speaking, it is the current state of the art in commercial synthetic papers that the inclusion of too much adsorbent tends to cause undesired, excess lateral ink spreading. However, if an insufficient quantity of adsorbent is present, undesired lateral spreading of the ink will be minimized, but the lack of a desired degree of adsorption can result in a higher tendency for the image to smear under contact. This invention resolves this trade off and enables reduced lateral spreading without an undesired increase in smearing.

Smearing Tendency Test

The smearing tendency of a print surface is measured by first applying a 0.5 µl drop of a water based inkjet ink (Cannon Cyan GI-290) to the surface of the film. Then a squeegee that does not absorb the ink is positioned at a steep angle to one side of the drop and then pulled over the drop and along the print surface until all ink is smeared down the film surface. The ink fluids are adsorbed and the dye or pigment in the ink delineates the area required to accomplish the adsorption. The area of the colored region is then measured. The process is repeated 10 times and the area of the colored region for the 10 samples is averaged.

Ink Spreading Test

To measure ink spreading, a 0.5 µl drop of black water based inkjet ink (Epson Black 664) is dispensed on to the printable surface with a pipet. The drop is permitted to spread for 5 minutes to thereby form a spot. The diameter of the spot is measured and the area calculated. This procedure is repeated 5 times and the average ink spot area is calculated. The area reflects the spreading behavior. The larger the area, the more spreading has occurred on the film. To promote good image quality it is desirable to minimize ink spreading.

The common tradeoff between smear resistance and ink spreading observed on commercial synthetic papers is presented in Table 4 below. It shows that when ink spreading is low, which is desirable for image quality, the tendency to smear is high. The best synthetic paper for desired low-level smearing is the worst performer for undesired high-level ink spreading. Moreover, the best synthetic papers for low spreading have unacceptably high smearing tendency. It also is quite possible to have both undesired high spreading and undesired high smearing tendency if the surface has low adsorption capacity and high surface energy.

TABLE 4

| Commercial Synthetic Paper | Dynes | Water Contact Angle | Smear (mm$^2$) | Spreading (mm$^2$) |
| --- | --- | --- | --- | --- |
| HMS/DPAEK 75 | >68 | 97 | 3189 | 63 |
| HOP Nanya XS GRADE | 40 | 83 | 1638 | 5 |
| HOP Nanya XT Grade | >68 | 84 | 873 | 16 |
| OULI 75 PP | >68 | 81 | 3628 | 137 |
| OULI 75 QuickDry PP | >68 | 85 | 144 | 208 |
| UPM | >68 | 96 | 1716 | 7 |
| Golden Dynamic PEPA-PI | >68 | 64 | 2545 | 103 |

Surprisingly, the printable surface in the films of this invention exhibit the unexpected feature that printability is improved for water-based inkjet ink if the contact angle increases.

Surprisingly, as the surface becomes less wettable (exhibiting higher contact angle) the print quality improves in the films of this invention. Table 5 below shows the water contact angle for examples 1, 3, and 4 described above. The printing images for these examples are shown in photographs above.

TABLE 5

| Example | Description | Corona Treatment | Water Contact Angle (degree) | Dynes |
|---|---|---|---|---|
| 1 | 20% Silica gel skin | no | 144 | 68 |
| 3 | 10% Silica gel skin | no | 123 | 33 |
| 4 | 5% Silica gel skin | no | 108 | 30 |
| 1 | 20% Silica gel skin | yes | 124 | 68 |
| 3 | 10% Silica gel skin | yes | 100 | 68 |
| 4 | 5% Silica gel skin | yes | 83 | 43 |

This observation is especially surprising for example 1 where both the corona-treated and untreated surfaces show very high surface energies of >68 dynes (test maximum) but water contact angles greater 100 degrees.

The following four examples (i.e., Examples 5-8) are additional, non-limiting examples of films within the scope of this invention and the manner in which such films were made. The dynes and water contact angle for these additional 4 examples are shown in Table 6, following the description of these latter examples.

Example 5

A 25% silica gel master batch was produced by successive passes through a twin-screw compounding extruder. 1800 g homo PP (FF030F2 from Braskem) pellets (or compounded pellets) were coated with 100 g of mineral oil (Howard Cutting Board Oil, Howard Products Inc.) and were then blended with up to 10% silica gel (Syloid C 805) particles. The mixture was fed into a lab twin screw extruder to produce strands that were water quenched and chopped into pellet. The pellets were dried overnight at 60C. 10% silica gel containing pellets were recoated with 100 g mineral oil content and blended again with 10% Silica gel particles and again extruded in the twin screw compounding extruder. The pellets were dried over night at 60C. The 20% silica gel containing pellets were recoated with 100 g mineral oil and again blended with 5% silica gel particles and extruded in the twin screw compounding extruder, then dried at 60C overnight. The 25% silica gel pellets were co-extruded with a base layer of homopolymer polypropylene. A cast sheet has been produced with a target thickness of the whole sheet of 1000 microns, of the skin 200 micron (FF030F2 from Braskem) as a skin layer of a cast sheet. The film was then biaxially oriented simultaneously 5x5 in a T.M. Long Stretcher at 145C.

Example 6

A master batch was produced in a manner described in Example 5 except that the polymer olefin binder in the master batch was a propylene/ethylene copolymer having 2.5% ethylene, by weight (DS6D21 from Braskem).

Example 7

A master batch was produced in a manner described in Example 5 except that the polymer olefin binder in the master batch was a maleated polypropylene (Admer QF 500A from Mitsui).

Example 8

A silica gel (Syloid C 805) compound using a precompounded PP/PE matrix was produced in a manner described in Example 5 except that the polymer olefin binder in the master batch was a compound of propylene ethylene copolymer/HDPE (MT 0523 DP from Tosaf).

As noted above the dynes and water contact angle for each of Examples 5-8 are presented in Table 6 below.

The invention allows better tradeoffs with respect to ink smearing and spreading tendencies as the data in Table 6 demonstrate.

TABLE 6

| Patent Example | Sample Description | Dynes | Water Contact Angle | Smear (mm$^2$) | Spreading (mm$^2$) |
|---|---|---|---|---|---|
| 1 | 20% Silica gel skin no treatment | >68 | 144 | 251 | 28 |
| 3 | 10% Silica gel skin no treatment | 33 | 123 | 1148 | 6 |
| 4 | 5% Silica gel skin no treatment | 33 | 108 | 1848 | 4 |
| 1 | 20% Silica gel skin corona treatment | >68 | 124 | 478 | 262 |
| 3 | 10% Silica gel skin corona treatment | >68 | 100 | 1328 | 85 |
| 4 | 5% Silica gel skin corona treatment | 43 | 83 | 1789 | 25 |
| 5 | 25% Silica gel in homo 5x5 no treatment | 35 | 112 | 1119 | 9 |
| 6 | 25% silica gel in Copo 5x5 no treatment | 36 | 106 | 520 | 40 |
| 7 | 25% silica gel in Maleated PP 5x5 no treatment | 36 | 121 | 830 | 18 |
| 8 | 25% silica gel in PP/PE Matte 5x5 | 36 | 115 | 950 | 20 |

Although the present invention has been described in connection with preferred embodiments thereof, it will be appreciated by those skilled in the art that additions, modifications, substitutions and deletions not specifically described may be made without departing from the spirit and scope of the invention defined in the appended claims.

What we claim as the invention is:

1. A multilayer extruded film comprising
a polymeric base layer, and
at least one exposed layer comprising:
   5 to 30 wt. % of an adsorbent silica gel having a pore size greater than 30 angstroms; and
   at least one polymer selected from the group consisting of polypropylene, propylene/ethylene copolymer, propylene/ethylene/butene terpolymer, maleated polypropylene and blends thereof,
wherein the film is oriented in at least one direction and the at least one exposed layer while exposed has a water contact angle of at least 100 degrees and a surface tension of at least 35 dynes, and
wherein the at least one exposed layer is at least one printable layer.

2. The multilayer extruded film of claim 1, wherein the at least one exposed layer comprises 10 to 25 wt. % of the adsorbent silica gel.

3. The multilayer extruded film of claim 2, wherein the pore size of the adsorbent silica gel is not greater than 500 angstroms.

4. The multilayer extruded film of claim 3, wherein the adsorbent silica has an internal pore surface area as per a BET adsorption isotherm of greater than 100 m$^2$/g and less than 700 m$^2$/g.

5. The multilayer extruded film of claim 4, wherein the at least one exposed layer is oxidatively treated.

6. The multilayer extruded film of claim 5, which is translucent and wherein the at least one exposed layer includes at least one of a void-creating agent and a whitening agent therein.

7. A printable label comprising the multilayer extruded film of claim 6.

8. The multilayer extruded film of claim 1, wherein the pore size of the adsorbent silica gel is not greater than 500 angstroms.

9. The multilayer extruded film of claim 1, wherein the adsorbent silica has an internal pore surface area as per a BET adsorption isotherm of greater than 100 $m^2/g$ and less than 700 $m^2/g$.

10. The multilayer extruded film of claim 1, wherein the at least one exposed layer is oxidatively treated.

11. The multilayer extruded film of claim 1, which is translucent.

12. The multilayer extruded film of claim 1, wherein the at least one exposed layer includes at least one of a void-creating agent and a whitening agent therein.

13. The multilayer extruded film of claim 1, wherein layers thereof are co-extruded.

14. A printable label comprising the multilayer extruded film of claim 1.

15. The multilayer extruded film of claim 1, wherein the adsorbent silica gel is present in an amount from 10 to 25 wt. % of the at least one exposed layer and has a pore size greater than 60 angstroms.

16. The multilayer extruded film of claim 1, wherein the at least one exposed layer comprises 15-20 wt. % of the adsorbent silica gel.

17. The multilayer extruded film of claim 1, wherein the at least one exposed layer comprises 20 wt. % of the adsorbent silica gel.

* * * * *